(12) United States Patent
Repenning

(10) Patent No.: US 7,995,863 B2
(45) Date of Patent: Aug. 9, 2011

(54) DIFFUSION-BASED INTERACTIVE EXTRUSION OF TWO-DIMENSIONAL IMAGES INTO THREE-DIMENSIONAL MODELS

(75) Inventor: Alexander Repenning, Boulder, CO (US)

(73) Assignee: AgentSheets, Inc., Boulder, CO (US)

( * ) Notice: Subject to any disclaimer, the term of this patent is extended or adjusted under 35 U.S.C. 154(b) by 0 days.

(21) Appl. No.: 12/632,790

(22) Filed: Dec. 7, 2009

(65) Prior Publication Data
US 2010/0135596 A1    Jun. 3, 2010

Related U.S. Application Data

(63) Continuation-in-part of application No. 11/122,513, filed on May 4, 2005, now Pat. No. 7,630,580.

(60) Provisional application No. 60/568,214, filed on May 4, 2004.

(51) Int. Cl.
*G06K 9/36* (2006.01)
*G06K 9/00* (2006.01)
*G06K 9/42* (2006.01)
*G06K 9/44* (2006.01)
G06T 15/00 (2006.01)
G06T 17/00 (2006.01)

(52) U.S. Cl. ........ 382/285; 382/154; 382/162; 382/256; 345/419; 345/420

(58) Field of Classification Search ................. 382/162, 382/285, 154, 256; 345/419, 420
See application file for complete search history.

(56) References Cited

U.S. PATENT DOCUMENTS

| 6,342,884 B1 * | 1/2002 | Kamen et al. ................. 345/423 |
| 6,456,287 B1 * | 9/2002 | Kamen et al. ................. 345/427 |
| 6,525,744 B1 * | 2/2003 | Poggio et al. ................. 345/619 |

* cited by examiner

*Primary Examiner* — Brian Q Le
*Assistant Examiner* — Jose M Torres
(74) *Attorney, Agent, or Firm* — Hamilton, DeSanctis & Cha LLP

(57) ABSTRACT

Methods and systems for creating three-dimensional models from two-dimensional images are provided. According to one embodiment, a method of creating an inflatable icon involves a vectorizing module polygonizing an input image to produce an inflatable image by representing a set of pixels making up the input image as polygons. The inflatable image is then extruded by an extrusion module by generating appropriate z-coordinate values for a reference point associated with each polygon of the inflatable image based upon a biased diffusion process. End-user controlled pressure modulation is supported by an interface module by (i) adjusting one or more modulation functions employed by the biased diffusion process based upon end-user input regarding relative modulation bias for a selected set of one or more pixels associated with the inflatable image or (ii) applying the biased diffusion process to only the selected set of one or more pixels.

20 Claims, 19 Drawing Sheets

800

1100

DIFFUSION-BASED INTERACTIVE EXTRUSION OF TWO-DIMENSIONAL IMAGES INTO THREE-DIMENSIONAL MODELS

CROSS-REFERENCE TO RELATED APPLICATIONS

This application is a continuation-in-part of U.S. patent application Ser. No. 11/122,513, filed on May 4, 2005, which claims the benefit of priority to U.S. Provisional Patent Application No. 60/568,214, filed on May 4, 2004, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2004-2009, AgentSheets, Inc.

BACKGROUND

1. Field

Embodiments of the present invention relate generally to creation of three dimensional ("3D") models. More particularly, embodiments of the present invention relate to methods and techniques of interactively extruding two dimensional ("2D") pixel-based images into polygon-based 3D models.

2. Description of the Related Art

While three dimensional (3D) content has certainly managed to become accessible in most households in form of game consoles and personal computers, it largely remains an artifact that is consumed but not produced by end-users. Nowadays end-user development is quickly advancing and end-users employ all kinds of authoring tools such as word processors and slide presentation tools to author their own content. 3D content is lagging behind not because of a hardware challenge—on the contrary, even the cheapest Personal Computers (PCs) now feature amazing 3D rendering capabilities—but because 3D authoring tools are mostly geared towards professional developers with proper training, time and motivation. Most 3D authoring tools use compositional approaches that have grown out of Computer Automated Design (CAD) software packages by conceptually extruding two dimensional (2D) authoring approaches to 3D. Instead of composing 2D models from rectangles and circles, users construct 3D models from cubes and spheres. While certainly feasible for professional users, these approaches can be inefficient and awkward in the hands of computer end-users trying to assemble irregular shaped models.

Sketching approaches are highly promising for the 3D end-user development. Sketching, often using pen-based interfaces and gestures, allows user to directly draw or annotate shapes. One line of work uses domain semantics to disambiguate sketches. One example, the Electronic Cocktail Napkin system, interprets pen drawn sketches to create diagrams with semantics by matching sketches against a large and expandable set of graphical primitives with user defined semantics. Digital Clay is another example which not only recognizes sketches, but can also construct appropriate 3D models. Sketch VR recognizes 2D geometric shapes that it can project into 3D architectural spaces. Gesture-based interfaces have also been used to create 3D models of mechanical designs. In CADICAM applications models are built by gradually attaching facets to 3D structures.

Freestyle sketching approaches do not rely on domain knowledge, but use sketching to create arbitrary 3D objects that are not interpreted semantically by the computer. Teddy is a sketching interface to create all kinds of sophisticated 3D models that "have a hand-crafted feel (such as sculptures and stuffed animals) which is difficult to accomplish with most conventional modelers." Teddy's inflation mechanism is based on closed regions. It does not use image information to generate models nor does it include texturing tools. Models created with Teddy do not include skins and need to be textured with third party painting applications.

A number of image-based extrusion approaches add three-dimensional looking effects to two-dimensional images without creating tree dimensional models. William's automatic airbrush creates compelling three-dimensional illustrations out of images by applying complex shading functions to selected regions. Simpler versions of this idea are found in popular paint programs. For instance, the bevel function in Photoshop is often used to create three-dimensional looking versions of two dimensional shapes such as 3D buttons. However, the results of these algorithms remain two-dimensional shapes with no user-accessible 3D model information.

Hence, there exists a need in the art for systems, methods, and techniques offering the ability for interactively extruding 2D pixel-based images into polygon based 3D models.

SUMMARY

Methods and systems are described for creating three-dimensional models from two-dimensional images. According to one embodiment, a method of creating an inflatable icon involves a vectorizing module polygonizing an input image to produce an inflatable image by representing a set of pixels making up the input image as polygons. The inflatable image is then extruded by an extrusion module by generating appropriate z-coordinate values for a reference point associated with each polygon of the inflatable image based upon a biased diffusion process. End-user controlled pressure modulation is supported by an interface module by (i) adjusting one or more modulation functions employed by the biased diffusion process based upon end-user input regarding relative modulation bias for a selected set of one or more pixels associated with the inflatable image or (ii) applying the biased diffusion process to only the selected set of one or more pixels.

In the aforementioned embodiment, representing the set of pixels as a plurality of polygons involves representing each pixel in the set of pixels as multiple triangles.

In various of the aforementioned embodiments, the method may further involve the interface module providing visual feedback to an end-user by rendering a current state of the inflatable image on a display device during an intermediate point of said biased diffusion process.

In the context of various of the aforementioned embodiments, the method further involves the interface module allowing end-user controlled color-based pressure modulation by adjusting color modulation functions employed by the biased diffusion process based upon end-user input regarding relative modulation bias for one or more colors associated with the input image.

In some instances of the aforementioned embodiments, the input image may represent a three dimensional image.

In various of the aforementioned embodiments, the method may involve prior to polygonizing the input image, generating the input image by receiving a large image, generating a down sampled image by down sampling the large image, and using the down sampled image as the input image. After extruding the inflatable image, the large image may be applied as skin on the extruded inflatable image.

Other embodiments of the present invention provide a program storage device readable by a computer system, tangibly embodying a program of instructions executable by one or more processors of the computer system to perform method steps for creating an inflatable icon. The method steps include polygonizing an input image to produce the inflatable icon by representing a set of pixels making up the input image as multiple polygons. The inflatable icon is extruded by generating appropriate z-coordinate values for a reference point associated with each polygon of the inflatable icon based upon a biased diffusion process. End-user controlled pressure modulation is supported by (i) adjusting one or more modulation functions employed by the biased diffusion process based upon end-user input regarding relative modulation bias for a selected set of one or more pixels associated with the inflatable icon or (ii) applying the biased diffusion process to only the selected set of one or more pixels.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
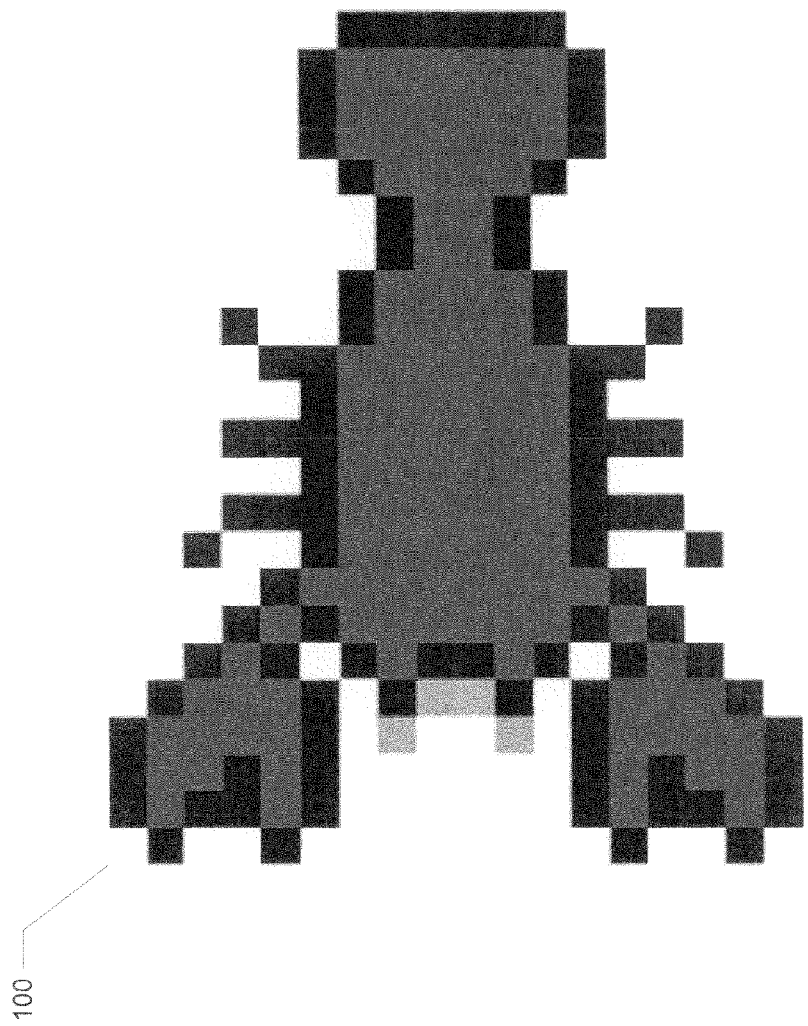
FIG. 1 depicts a 2D lobster icon 100 which will be turned into an Inflatable Icon in accordance with an embodiment of the present invention.

Methods are described for a biased diffusion technique controlled by 2D images to allow end-users to efficiently design 3D objects. Various embodiments of the present invention seek to enable end-users to create simple 3D models based upon 2D images. In many cases some suitable 2D artwork can be relatively easily found or produced to serve as input for an interactive 2D to 3D transformation process. According to one embodiment, referred to herein as "Inflatable Icons," 2D pixel-based images are interactively extruded into polygon-based 3D models with minimal input required by end-users. In one embodiment, Inflatable Icons combine diffusion-based image extrusion with a number of interactively controllable parameters to allow end-users to efficiently design 3D objects.

According to one embodiment, end-users are provided with the ability to interactively steer the extrusion process through user controllable parameters in order to create intricate 3D objects.

In contrast to Teddy and related sketch-based approaches, according to one embodiment, Inflatable Icons start as 2D icons. These icons may be produced by the end-user or may be found in icon collections, such as the Icon Factory. Icons are not only decoration in the sense that they will be used later as the skin of the model but they also drive the inflation process. At the most fundamental level, the icon mask is used to derive the basic shape of the model. In more complex cases, as described in more detail below, the color value of each pixel may be analyzed as well and may be used to control the diffusion process.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

While, for convenience, embodiments of the present invention are described with reference to low resolution 2D icons, the transformation process is equally applicable to various other types of end-user supplied or created input images, such as high resolution 2D images or 3D images initially having a constant z-value.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling.

The term "diffusion" generally refers to the spontaneous spreading of physical or conceptual entities such as particles, matter, or ideas over space and time.

The phrase "extrusion process" generally refers to any process that with, or without interpretation of a 2D object creates a 3D object.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

Overview

There are many applications, such as rapid prototyping, simulations and presentations, where non-professional computer end-users could benefit from the ability to create simple 3D models. Existing tools are geared towards the creation of production quality 3D models by professional users with sufficient background, time and motivation to overcome steep learning curves.

Inflatable Icons is the name of a new technique that can interactively extrude 2D pixel-based images into polygon-based 3D models. Depending upon the complexity of the inflation, minimal or no input may be received from end-users. In one embodiment, Inflatable Icons combine diffusion-based image extrusion with a number of interactively controllable parameters to allow end-users to efficiently design 3D objects.

The general idea is that in many cases some suitable 2D icon artwork can be relatively easily found or produced to serve as input for an interactive 2D to 3D transformation process. Since the extrusion process is intrinsically ambiguous, to achieve the desired results, it is preferable to have some form of end-user input to appropriately guide the extrusion process. According to one embodiment, visual feedback is provided to the end-user in the form of intermediate results of the extrusion process. In this manner, the process is completely visible at any point in time to end-users and can be made interactive to allow end-users to explore the effects of changing various user-controlled parameters.

According to one embodiment, Inflatable Icons are based on an extrusion process that adds a third dimension to a two dimensional image. As mentioned above, however, in alternative embodiments, the initial input might be a three-dimensional image that initially has a constant z-value for each pixel. Then, the z-values may be subsequently adjusted based on the extrusion process. Conceptually, the extrusion process can be compared to the inflation of a balloon. An initial image, such as a low resolution 2D icon, defines the basic shape of the balloon as well as the image painted onto the balloon. A circular shaped balloon, for instance, is extruded into a sphere.

For sake of illustration, the examples described herein first introduce a simple inflation mechanism and then gradually refine this mechanism by adding user controllable parameters. According to one embodiment, users are provided with the ability, via a novel graphical user interface, to interactively steer the extrusion process through these parameters in order to create intricate 3D objects.

While one intended application domain is the use of Inflatable Icons in multi-agent simulation authoring tools employed in education, such as AgentSheets or StarLogo, Inflatable Icons are useful for a number of end-user applications including presentation software, video games, and 3D sketching. With multi-agent simulation authoring tools, end-users, typically kids, create complex simulations involving hundreds and even thousands of agents. These agents are visualized as icons drawn by kids. Inflatable Icons add new features and capabilities to such simulations. For instance, simulation worlds no longer have to adopt a birds-eye, top down perspective. Instead, a camera can be placed anywhere into a simulation world featuring arbitrary orientation including first and third person perspectives. 3D can disambiguate the spatial relationships between objects. For instance, in AgentSheets agents can be stacked on top of each other. A vase agent can be on top of a table agent, which, in turn, can be on top of a floor agent. In a 2D orthogonal top-down view this often becomes confusing to users. While the quality of a 3D model resulting from the techniques presented herein may not completely satisfy a professional 3D model builder, the quality is thought to be more than sufficient for such multi-agent simulation applications and the like.

According to one embodiment, with the use of Inflatable Icons, end-users can very quickly create simulation worlds containing large numbers of simple 3D objects. In a multi-agent simulation application it is more important for users to be able to visualize the spatial relationships between agents then to have a high quality 3D representation of any individual agent.

Figure 15:
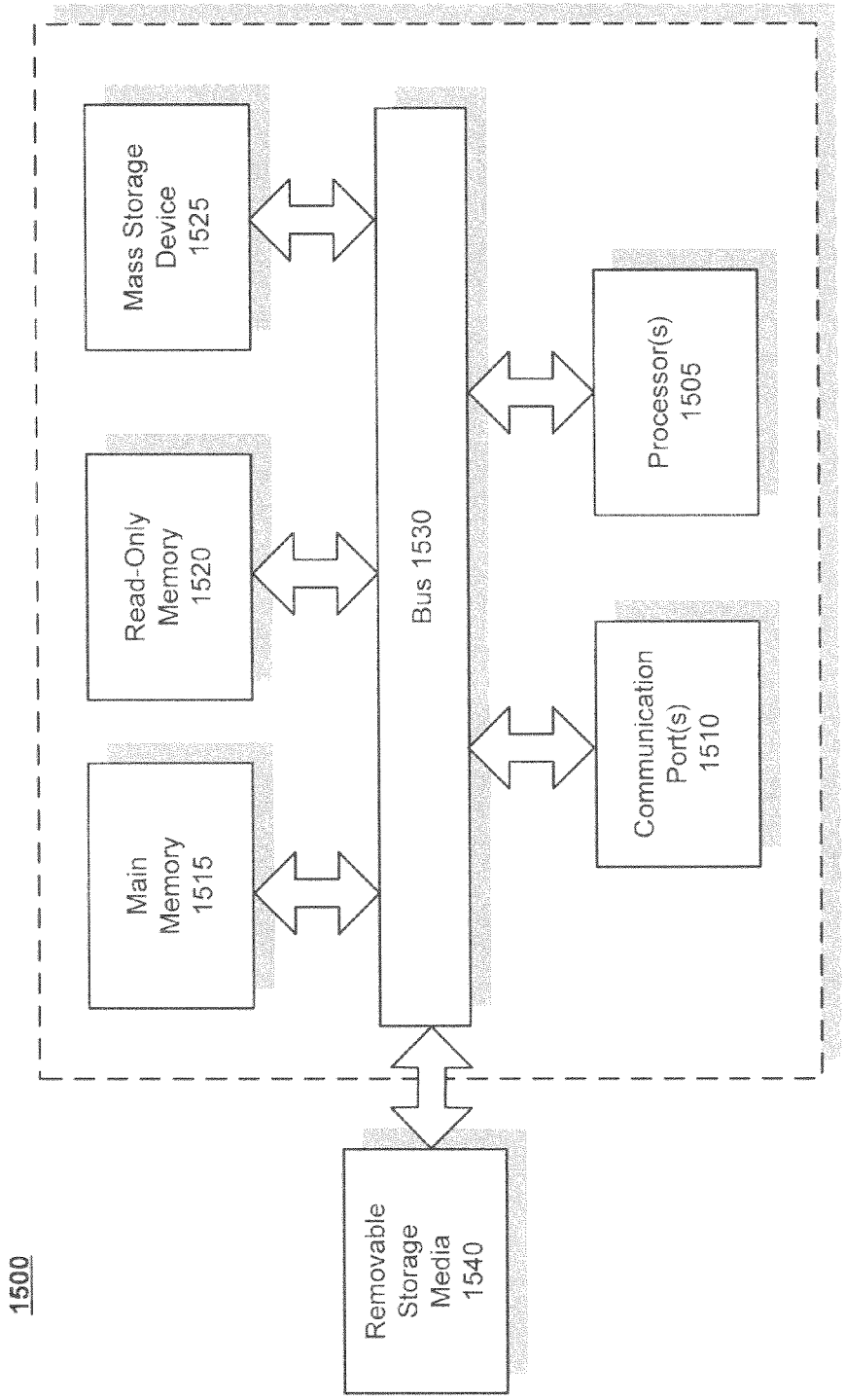
FIG. 15 is an exemplary computer system 1500 which may be used in accordance with various embodiments of the present invention.

FIG. 15 is an example of a computer system 1500 with which embodiments of the present invention may be utilized. Embodiments of the present invention include various steps, which will be described in more detail below. A variety of these steps may be performed by hardware components or may be tangibly embodied on a computer-readable medium in the form of machine-executable instructions, which may be used to cause one or more general-purpose or special-purpose computer processors or microprocessors programmed with instructions to perform these steps. Alternatively, the steps may be performed by a combination of hardware, software, and/or firmware. As such, FIG. 15 is an example of a computer system 1500, such as a workstation, personal computer, laptop, client or server, upon which or with which embodiments of the present invention may be employed.

According to the present example, the computer system includes a bus 1530, one or more processors 1505, one or more communication ports 1510, a main memory 1515, a removable storage media 1540, a read only memory 1520 and a mass storage 1525.

Processor(s) 1505 can be any future or existing processor, including, but not limited to, an Intel® Itanium® or Itanium 2 processor(s), or AMD® Opteron® or Athlon MP® processor(s), or Motorola® lines of processors. Communication port(s) 1510 can be any of an RS-232 port for use with a modem based dialup connection, a 10/100 Ethernet port, a Gigabit port using copper or fiber or other existing or future ports. Communication port(s) 1510 may be chosen depending on a network, such a Local Area Network (LAN), Wide Area Network (WAN), or any network to which the computer system 1500 connects.

Main memory 1515 can be Random Access Memory (RAM), or any other dynamic storage device(s) commonly known in the art. Read only memory 1520 can be any static storage device(s) such as Programmable Read Only Memory (PROM) chips for storing static information such as start-up or BIOS instructions for processor 1505.

Mass storage 1525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc. According to one embodiment, mass storage 1525 has tangibly embodied thereon instructions, which when executed by processor(s) 1505, cause instances of one or more of the classes of FIG. 9 to be instantiated to identify a computer program solution to a problem at issue as described further below.

Bus 1530 communicatively couples processor(s) 1505 with the other memory, storage and communication blocks. Bus 1530 can include a bus, such as a Peripheral Component Interconnect (PCI)/PCI Extended (PCI-X), Small Computer System Interface (SCSI), USB or the like, for connecting expansion cards, drives and other subsystems as well as other buses, such a front side bus (FSB), which connects the processor(s) 1505 to system memory.

Optionally, operator and administrative interfaces, such as a display, keyboard, and a cursor control device, may also be coupled to bus 1530 to support direct operator interaction with computer system 1500. Other operator and administrative interfaces can be provided through network connections connected through communication ports 1510.

Removable storage media 1540 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the invention.

Vectorizing (Polygonizing) Icons

An Inflatable Icon, like a regular icon, may include a two-dimensional pixel array. According to one embodiment, each pixel is represented as a color and alpha RGBA value (red, green, blue, alpha). For simplicity, the present example uses only a one-bit alpha value: a pixel is either fully visible or invisible. FIG. 1 shows a 2D icon 100 in the form of a lobster, which will be turned into an Inflatable Icon (400, 500).

The Inflatable Icon has a $z_{x,y}$ value for each x, y coordinate. These z values are initially set to zero or some other constant value. Unlike regular icons, in accordance with various embodiments of the present invention, an Inflatable Icon is a true 3D object in the sense that it is represented as 3D polygons having a $z_{x,y}$ value for each x, y coordinate of the polygons. According to the present example, a simple, but somewhat brute force approach to polygonizing—in terms of number of polygons required—is to use triangle strips and represent each pixel as a square consisting of two triangles. As described below, triangle strips work especially well when rendering objects with smooth shading. In alternative embodiments, other polygonization approaches such as tracing may be used to convert 2D raster-based images into 2D vector/polygon based images not intended to be converted into 3D models.

Figure 2:
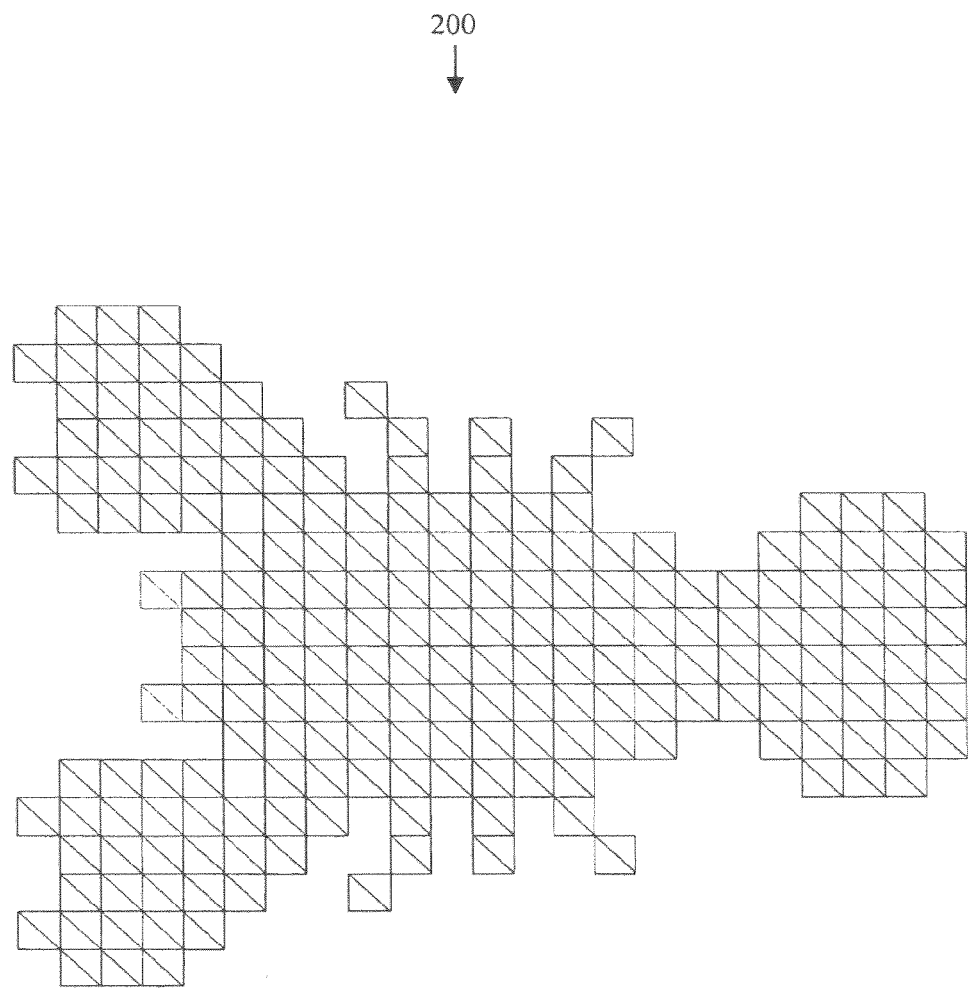
FIG. 2 illustrates a polygonization 200 of the 2D lobster icon of FIG. 1 according to one embodiment of the present invention.
Figure 3A:
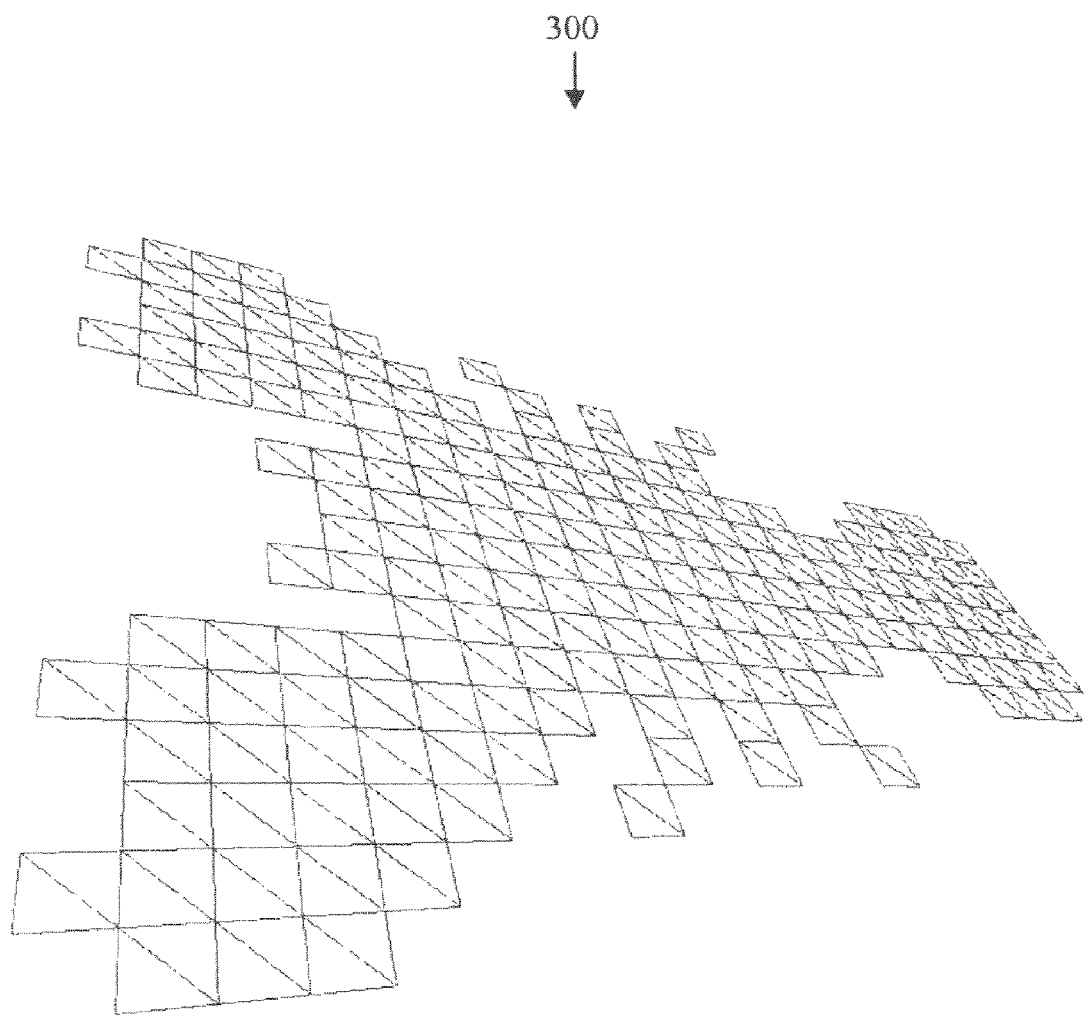
FIG. 3A illustrates a 3D version 300 of the polygonized lobster icon 200 with a constant z-value for each polygon according to one embodiment of the present invention.

As a convention, herein the upper left corner of each square is defined to be the reference point representing the z-value for the square. According to alternative embodiments, another reference point of the square may be used and/or more than one reference point may be used. In the present example, since all the z values are initialized to zero, the initial set of polygons is a planar set of polygons. FIGS. 2 and 3A represent an exemplary polygonization (200, 300) of the 2D icon 100 of FIG. 1 in accordance with one embodiment of the present invention.

Diffusion-Based Image Inflation

There are a number of ways of implementing an inflation process. In Teddy, for instance, the system uses a skeleton based approach to inflate closed regions with amounts depending on the width of the regions. Wide areas become fat and narrow ones become thin. The approach used by various embodiments of the present invention, by contrast, is image-based, meaning such Inflatable Icons are based on a diffusion process taking place at the pixel level.

Diffusion is a gradual process in which physical as well as conceptual matter, such as molecules, heat, light, gas, sound, and ideas are spread over an n-dimensional space in time. In computer graphics diffusion and related operations are often used as technique to smooth or to deform 3D objects.

According to various embodiments, the notion of inflation is captured with a biased diffusion process. Unlike most diffusion applications, including the use of diffusion for smoothing, biased diffusion does not attempt to preserve the total amount of matter. A biased diffusion intentionally changes the amount of matter. The resulting process resembles inflation quite closely. The bias introduced to diffusion is a measure for pressure. Pressure added to an Inflatable Icon gradually extrudes the image-based mesh from a flat shape into a 3D model. This is one aspect that makes the biased diffusion process unique in the sense that it does not transforms one 3D object into another but effectively turns 2D objects into 3D objects.

According to one embodiment, biased diffusion can be represented with a difference equation computing a new value based on the four Newman neighbors (north, south, east, west) and itself. The same diffusion process applies for different neighborhoods as long as at least one neighbor is selected as input to the diffusion process. Diffusion also works in linear, 2D, 3D, n-D applications and for non orthogonal networks.

Example Biased Diffusion Equation $$z_{x,y} = D(z_{x-1,y} + z_{x+1,y} + z_{x,y-1} + z_{x,y+1} - 4z_{x,y} + p) + z_{x,y} \quad \text{EQ \#1}$$

where, D is the diffusion coefficient [0 . . . 0.5], and p is a number corresponding to pressure.

In the present example, a positive pressure, p, inflates, while a negative pressure deflates. All z values are initialized to 0. Z values of invisible pixels remain always 0. Masked pixels surrounding the Lobster icon will clamp down, i.e., the pixels at the edge of the icon will pull the diffusion values down to zero. Pixels inside the icon far away from the edge will assume the highest z values.

Figure 3B:
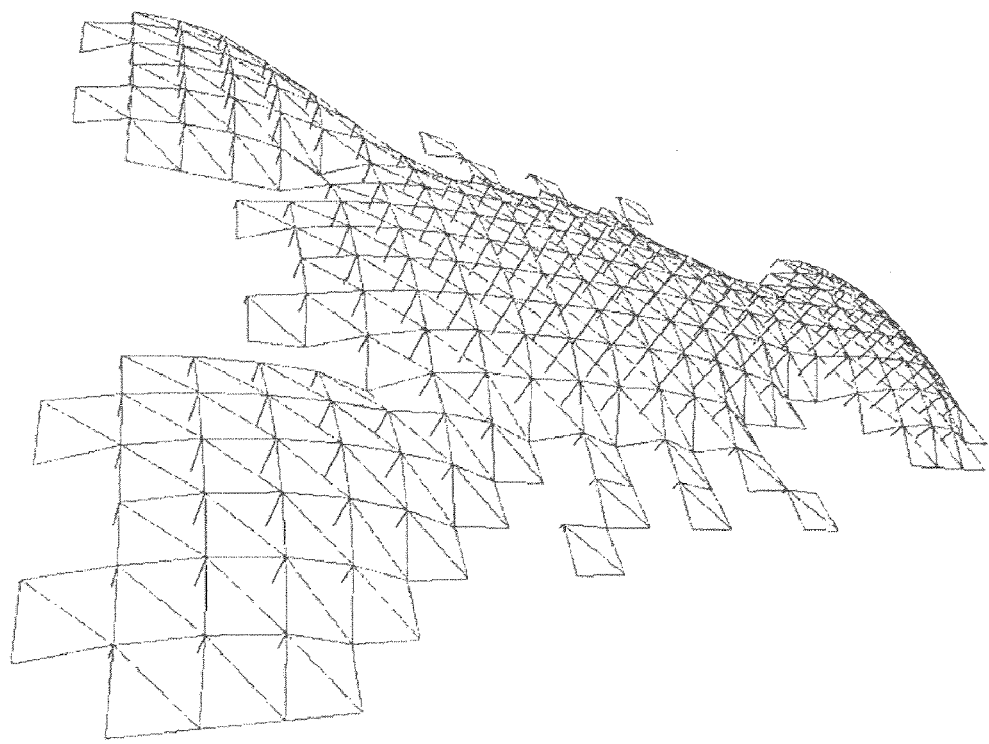
FIGS. 3B-3C depict the application of an extrusion process to the 3D lobster image 300 of FIG. 3A according to one embodiment of the present invention.
Figure 3C:
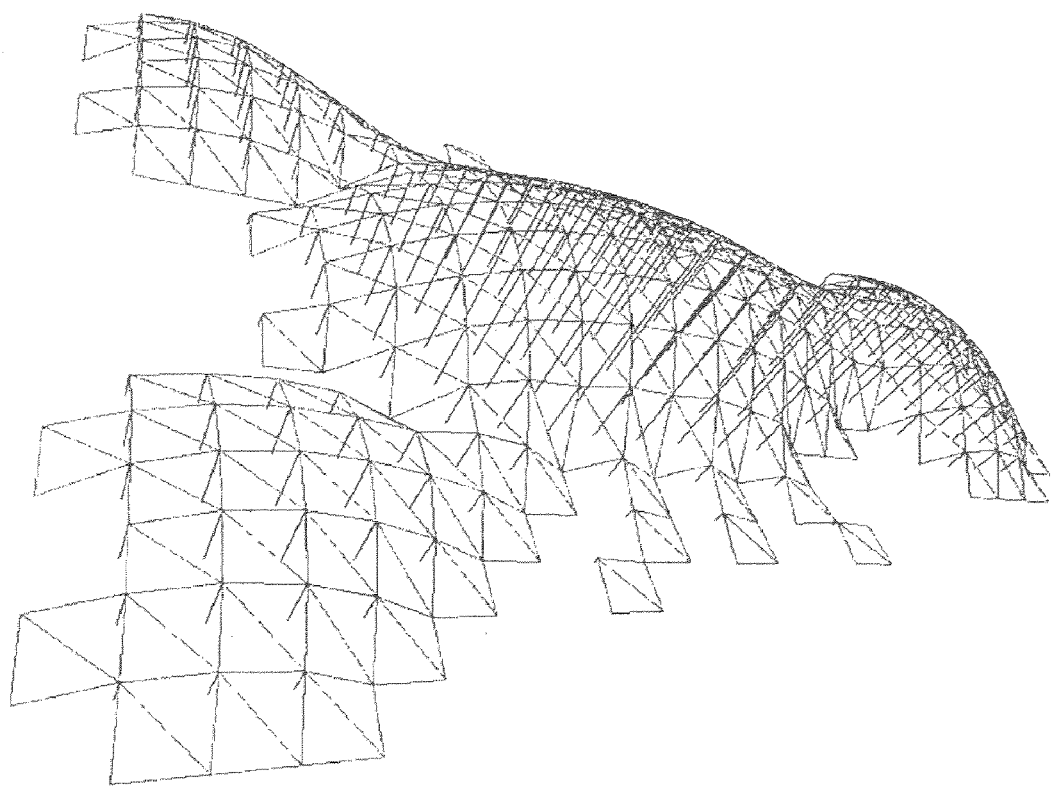

Applying pressure to the Inflatable Icon will gradually pump the Lobster icon up as illustrated in FIGS. 3B and 3C.

Figure 4:
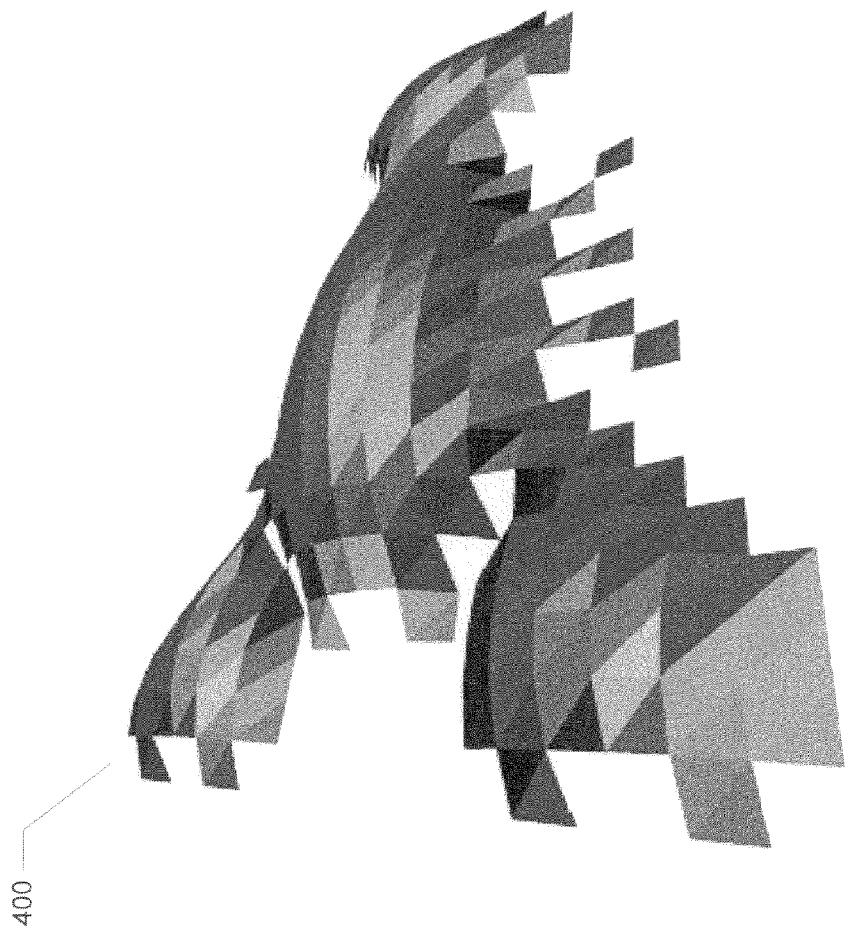
FIGS. 4-5 depict the extruded 3D lobster image of FIG. 3C with filled polygons and enabled lighting (400, 500) to make it resemble a solid object in accordance with one embodiment of the present invention.
Figure 5:
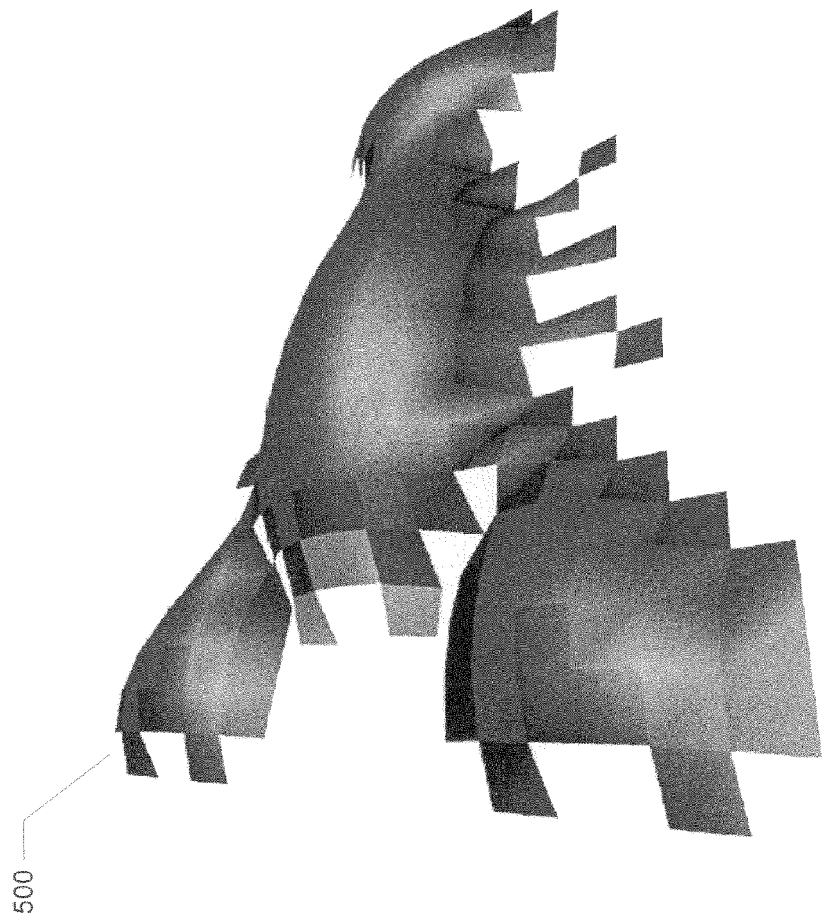

As illustrated in FIGS. 4 and 5, rendering polygons filled and enabling lighting will make the Inflatable Icon look like a solid object. Because of the regular grid structure of the underlying image it is particularly simple to implement Gouraud shading by computing normal vectors for each vertex and not just for each triangle face as follows:

$$\vec{n}_{x,y} = \begin{pmatrix} z_{x-1,y} - z_{x+1,y} \\ z_{x,y-1} + z_{x,y+1} \\ 2m \end{pmatrix} \quad \text{EQ \#2}$$

where, m is the grid size (m=Δx=Δy)

The Inflated Icon can also be rendered using simpler shading approaches, such as flat shading, or more complex shading, such as Phong shading.

While embodiments of the present invention are described with reference to the biased diffusion equation of EQ #1 (above), it is contemplated that various other equations may be employed, including, but not limited to the following more general biased diffusion equation.

$$z_{0,t+1} = z_{0,t} + D\left[p + \sum_{i=1}^{n}(z_{i,t} - z_{0,t})\right] \quad \text{EQ \#3}$$

User Control

Below, a number of parameters that provide users with extrusion options are described. In addition to an ever-growing number of parameters, user testing demonstrates continuous feedback during the extrusion process helps users enormously in building inflatable icons. Depending upon the particular embodiment, feedback may be presented as parameters in a numerical form or feedback may be provided by displaying intermediate results of the diffusion process. The nature of the diffusion process is highly iterative. The extrusion of an image into inflated icons typically requires dozens to hundreds of iterations. Instead of keeping this computation hidden behind the scenes, according to one embodiment, it is made part of the interface explicitly revealing the diffusion process to its users as a continuous inflation animation. This allows users to interactively explore the inflation process.

Antialiasing

According to one embodiment, Icons are low-resolution, small, two-dimensional images. A typical desktop icon has a size of 32×32 pixels. Even so called "huge" icons (in Apple's OS X) have a size of 128×128 pixels. Small size, on the one hand, makes the inflation computationally process feasible, but, on the other hand, results in shapes that have a smooth surfaces but jagged edges.

Figure 6B:
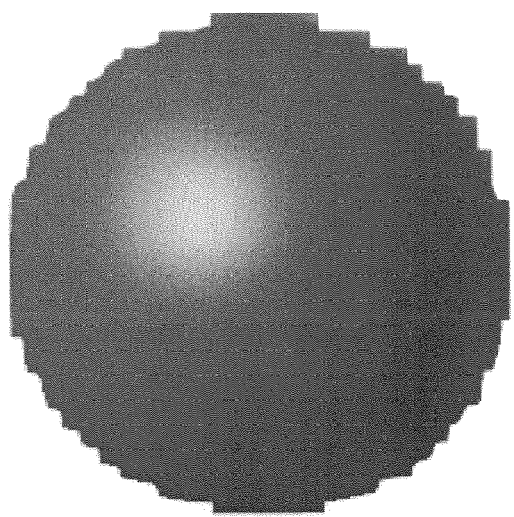
FIG. 6B illustrates the result of an icon inflation process in accordance with one embodiment of the present invention on FIG. 6A.
Figure 6A:
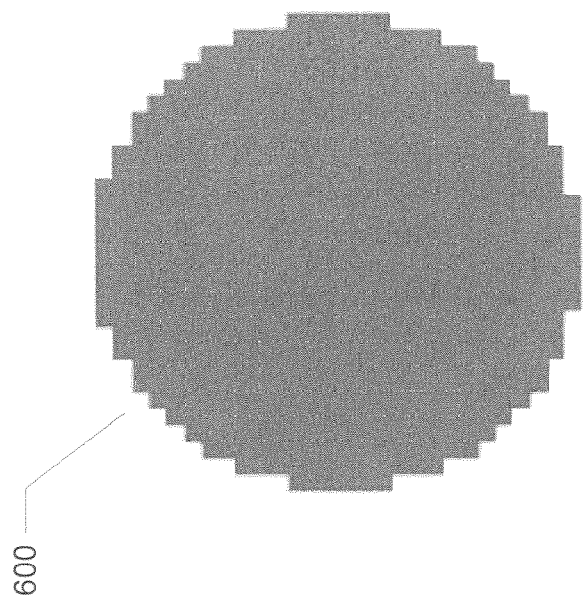
FIG. 6A depicts a 1 bit alpha circle icon 600 manifesting highly visible aliasing.

As illustrated by FIG. 6A, a 32×32 pixel icon in the form of a 1 bit alpha circle icon manifests highly visible aliasing.

Figure 7B:
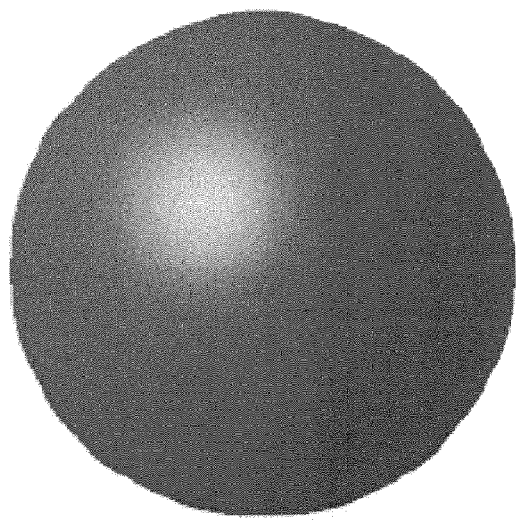
FIG. 7B depicts FIG. 6B after performing antialiasing in accordance with one embodiment of the present invention.
Figure 7A:
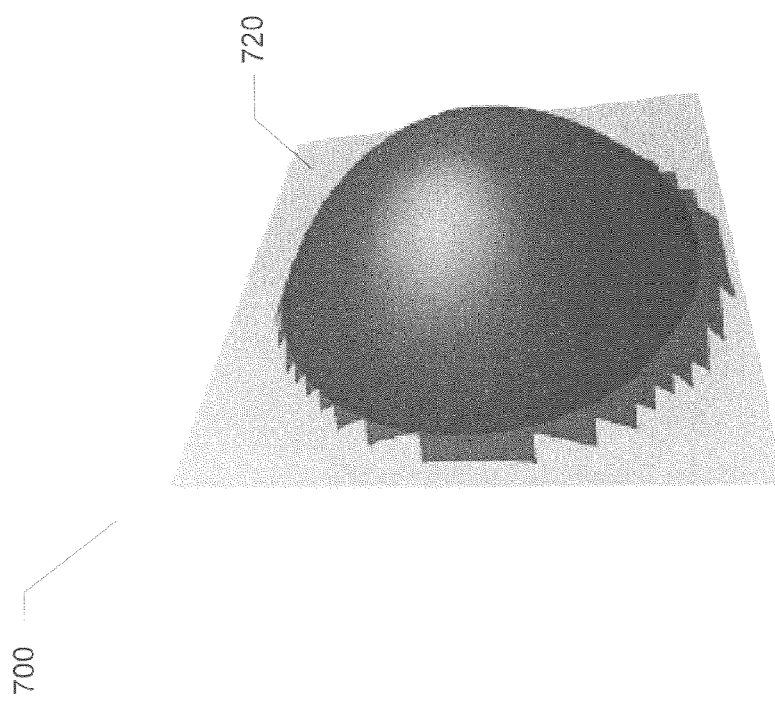
FIG. 7A depicts a perspective view 700 of FIG. 6B.

Icon Inflation turns the circle of FIG. 6A into a hemisphere with a smooth surface but jagged edge as shown in FIG. 6B. FIG. 7A is a perspective view of FIG. 6B. In this view, the edge of a rotated hemisphere will look even worse. The diffusion process used for the inflation also helps to smooth the edge.

Figure 8B:
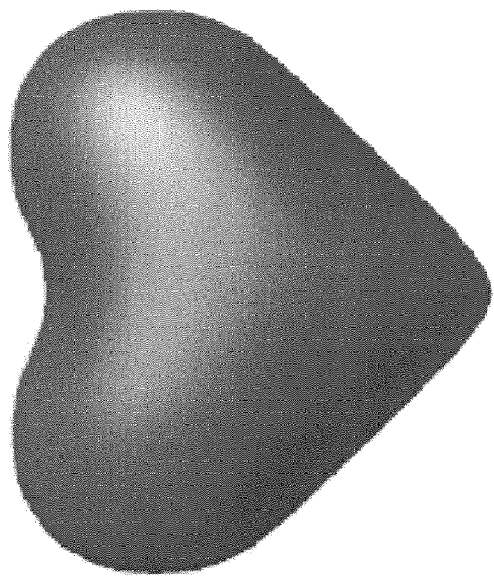
FIG. 8B illustrates a 3D heart icon resulting from application of a diffusion and clipping process to the 2D hear icon 800 of FIG. 8A in accordance with one embodiment of the present invention.
Figure 8A:
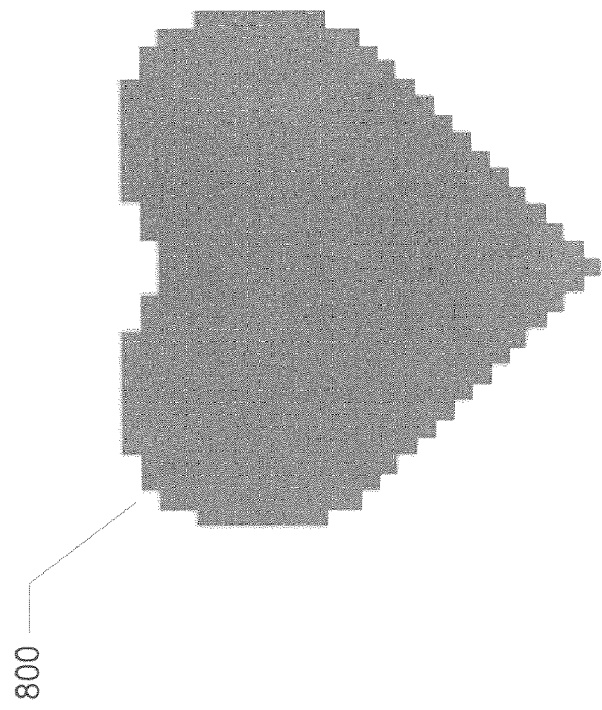
FIG. 8A illustrates a 2D heart icon 800.

A simple, yet effective, antialiasing affect is achieved through a clipping plane 720 parallel to the x/y plane with a small z value. According to one embodiment, the selection of a z value for the clipping plane is user controlled through a slider interface, similar to the one shown in FIG. 14. In alternative embodiments, this process may be automated. A small z value will preserve the original shape but still manifest the jagged edges. A large z value, in contrast, will make the edge of the shape smooth but will also thin out the shape. FIGS. 8A and 8B illustrates how the sharp tip of a 2D heart icon gets lost during the diffusion and clipping process because of the smoothing.

Pressure Modulation

Figure 9B:
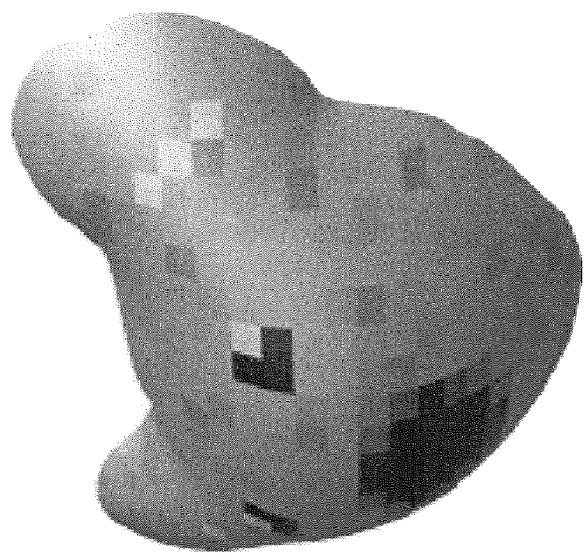
FIG. 9B illustrates the uniformly inflated version of the 2D teddy bear icon 900 of FIG. 9A in accordance with one embodiment of the present invention.
Figure 9A:
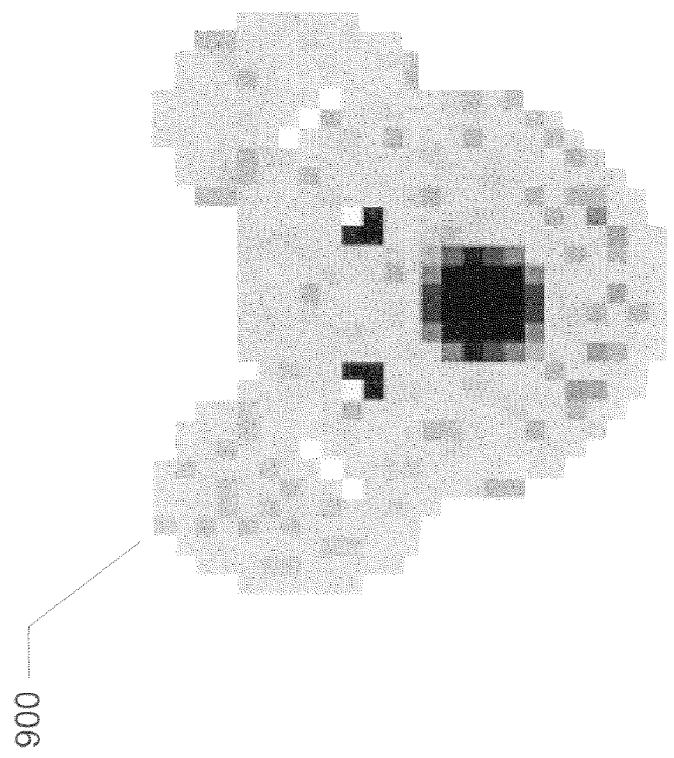
FIG. 9A depicts a 2D teddy bear icon 900.

Uniform diffusion does not always create the desired affect. In many cases some regions of an icon need more pressure and others need less pressure for an inflated icon to look right. FIG. 9B illustrates an inflated version of the teddy bear icon illustrated in FIG. 9A. The inflated icon in FIG. 9B does not look particularly compelling especially when viewed from the side. One would expect the black nose to be more prominently extruded and the ears more pronounced. Without this the resulting shape has the appearance of an inflated balloon with the face of the teddy bear merely painted on.

According to one embodiment, to achieve the desired effect, the universal pressure, p, in the biased diffusion equation presented above may be replaced with a pixel coordinate depending function. This function may modulate the pressure for each pixel based on various factors, including, but not limited to absolute pixel location, the pixel's proximity to a selected pixel, the pixel color, whether the pixel is among a set of selected pixels (by a magic wand, bounding box or other selection mechanism, for example).

Exemplary color-based modulation functions are as follows for the teddy bear icon:

m(black)=1;
m(white)=−3;
otherwise m=0.

Figure 9C:
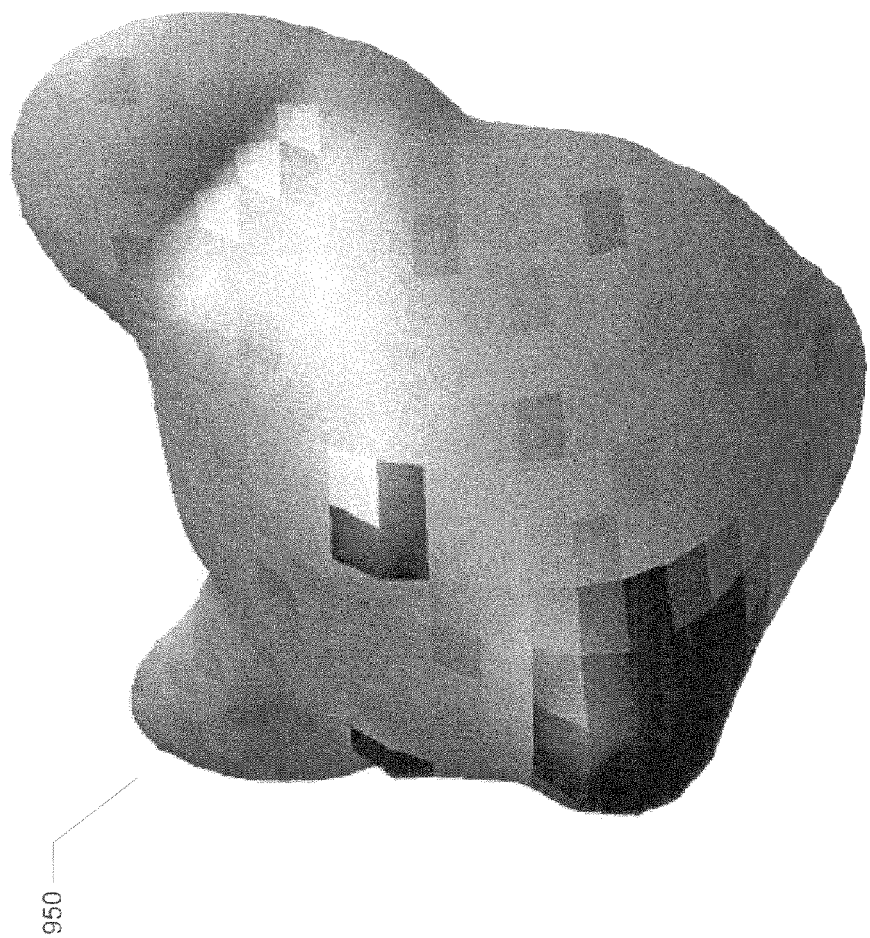
FIG. 9C illustrates a non-uniformly inflated version 950 of the 2D teddy bear icon 900 of FIG. 9A using a modulated pressure in accordance with one embodiment of the present invention.

FIG. 9C illustrates an exemplary solution. According to this example, the black pixels representing the nose modulate the pressure positively whereas the three white pixels serving as edge between the main sphere of teddy's head and his ears modulate the pressure negatively.

While end-users may in some embodiments specify color modulation functions, in other embodiments, end-users simply pick colors (or color ranges) from palettes. For each selected color, they may use a graphical input mechanism, such as a slider, for example, with a limited positive and negative range to define a modulation bias. Sliders provide a good interactive means to control color-based pressure modulation.

As indicated above, the modulation mechanism can be generalized in multiple ways. For example, instead of applying the modulation function to all the visible pixels of an icon, a user may alternatively select a subset of pixels to be used for the diffusion process. This approach allows a user to manually shape an icon by inflating or deflating user-defined regions of icons. Additionally, the user may select for an open-ended set of modulation functions to create special inflation/deflation effects. Users may even provide their own functions to be used in the diffusion process. The alpha channel of an icon/image may consist of more than one bit of information, e.g., 256 values of gray, to define a continuous transparency value of pixels. This alpha value can be used to further guide the inflation process.

Figure 10B:
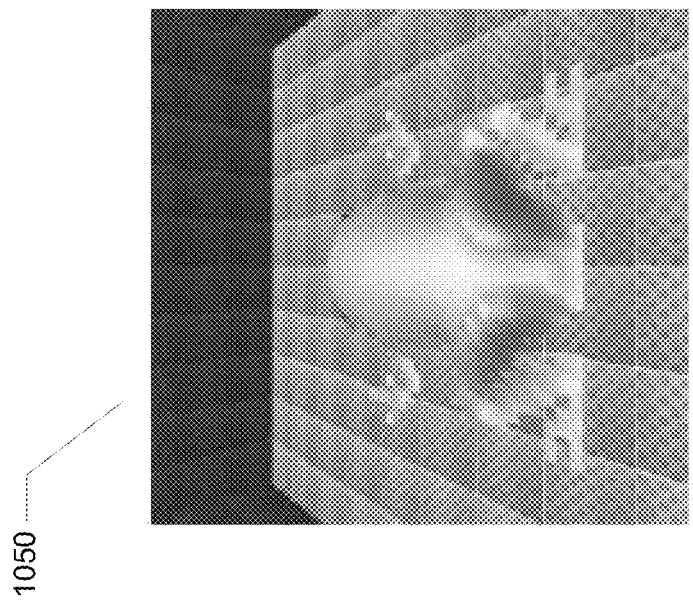
FIG. 10B illustrates a non-uniformly inflated 3D frog icon 1050 using a modulated pressure in accordance with one embodiment of the present invention.
Figure 10A:
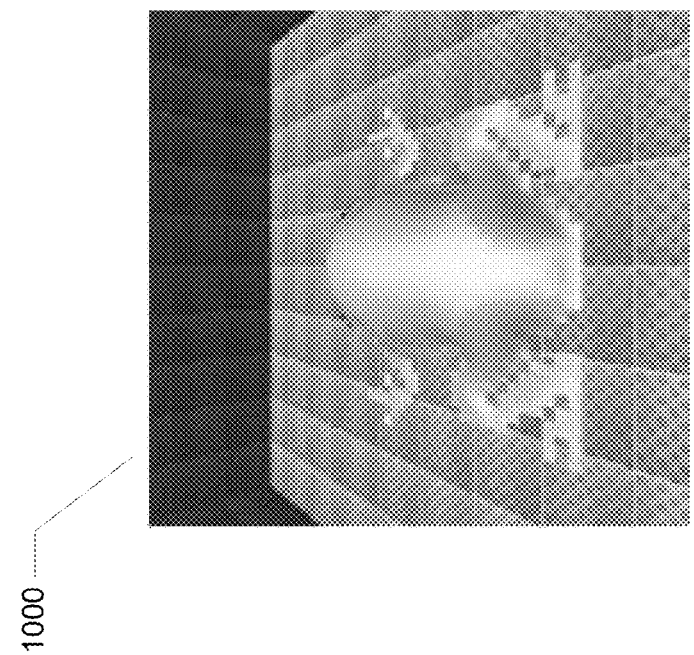
FIG. 10A illustrates a uniformly inflated 3D frog icon 1000 in accordance with one embodiment of the present invention.

FIG. 10A illustrates a uniformly inflated 3D frog icon 1000. FIG. 10B illustrates a non-uniformly inflated 3D frog icon 1050 resulting from a selection-based inflation in accordance with one embodiment of the present invention. In one embodiment, an end user is provided with tools that allow the end user to make and extend pixel selections. For example, a magic wand pixel selection tool may select pixels based on pixel color values. Alternatively, the magic wand pixel selection tool may select pixels within a preselected or configurable distance from the hot spot associated with the magic wand. In the context of the present example, the 3D frog icon 1000 fails to highlight the strong legs of the frog. Using the magic wand pixel selection tool, the frog's legs may be selected and inflated more as illustrated in FIG. 10B. According to this example, selection of the darker pixels representing the legs nose causes more pressure to be applied to the selected region whereas the pixels outside of the selected region remain in their previous state.

Noise

Objects found in nature, such as rocks, often do not have smooth surfaces. Noise can be added to give inflatable icons a more organic look. According to one embodiment, users are provided with two noise parameters:

Amount: Control the noise amplitude.
Bumpiness: Should the surface be more spiky or smooth?

Figure 11B:
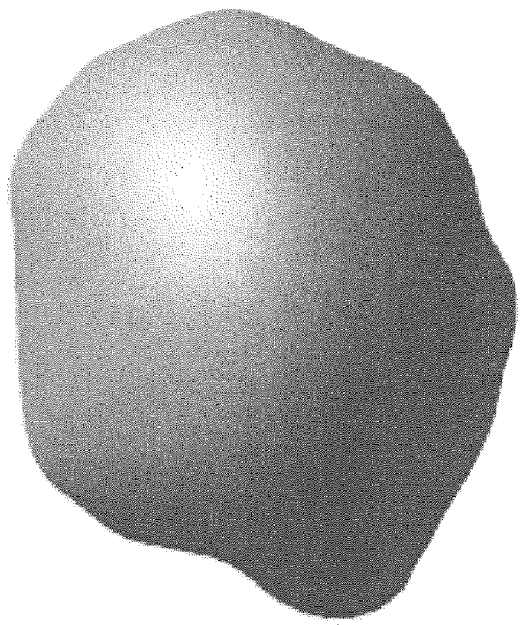
FIG. 11B illustrates an inflated version of the 2D rock icon 1100 of FIG. 11A in accordance with one embodiment of the present invention.
Figure 11A:
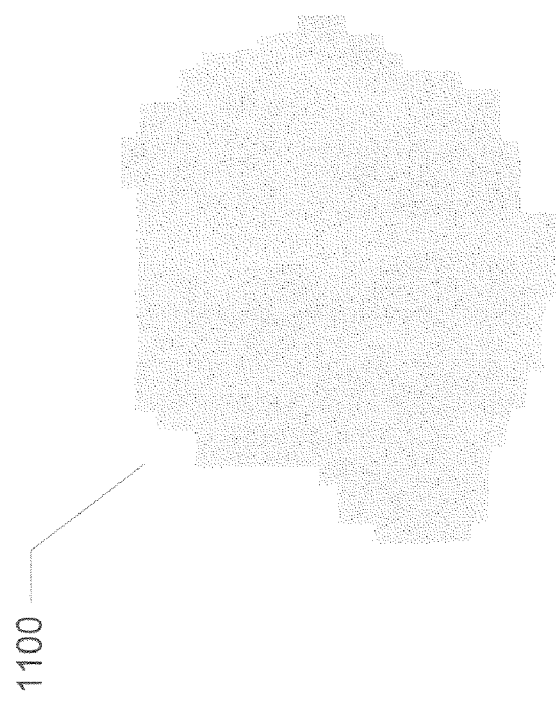
FIG. 11A illustrates a 2D rock icon 1100 to be inflated.

As an example, if an end-user wanted to create a model of a rock, a gray blob icon would first be drawn quickly, see FIG. 11A, for example, and then inflated as in FIG. 11B.

Figure 12:
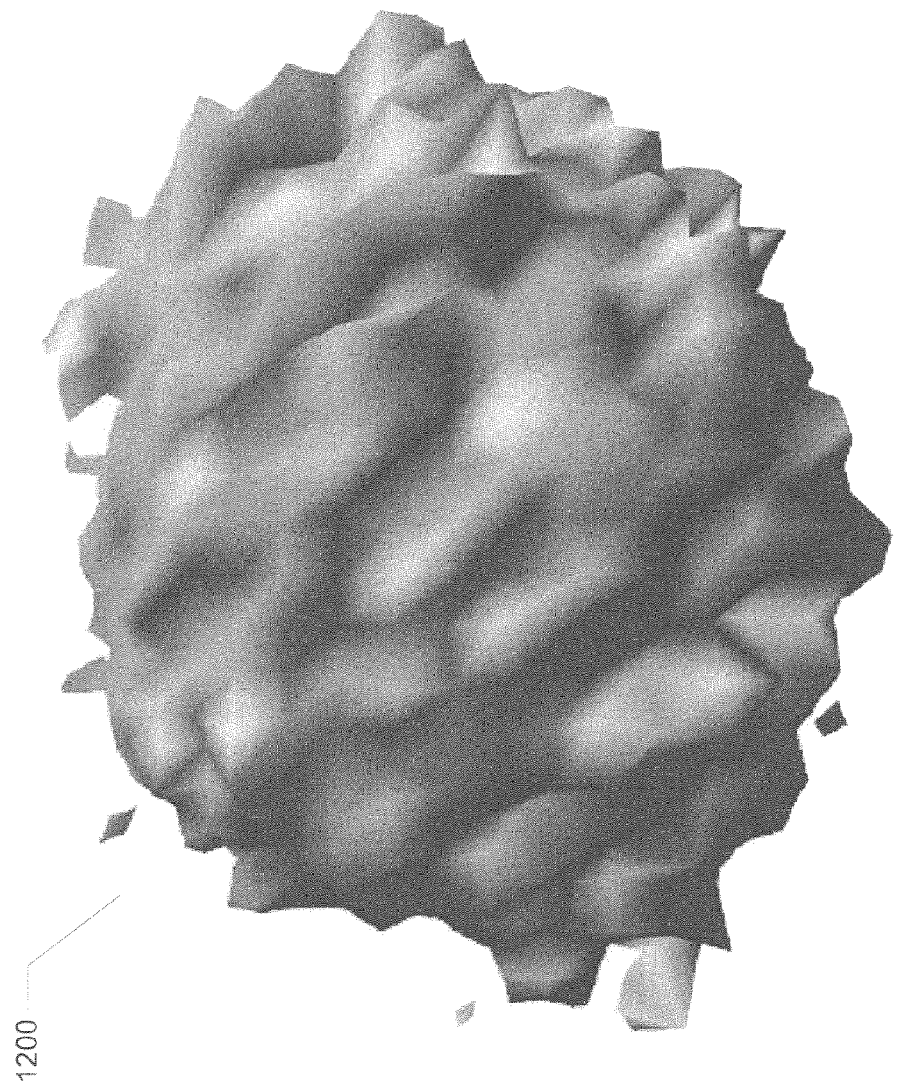
FIG. 12 represents a noise enhanced version 1200 of the 3D rock of FIG. 11B after random noise is added to each z-component of the inflated icon in accordance with one embodiment of the present invention.

FIG. 12 illustrates the addition of noise to the inflated icon of FIG. 11B. Noise is added, by using a random function, to each $z_{x,y}$ of the inflated icon with values in between −amplitude and +amplitude. In many cases, including this one, the random spikes added to the surface may require smoothing.

Figure 13B:
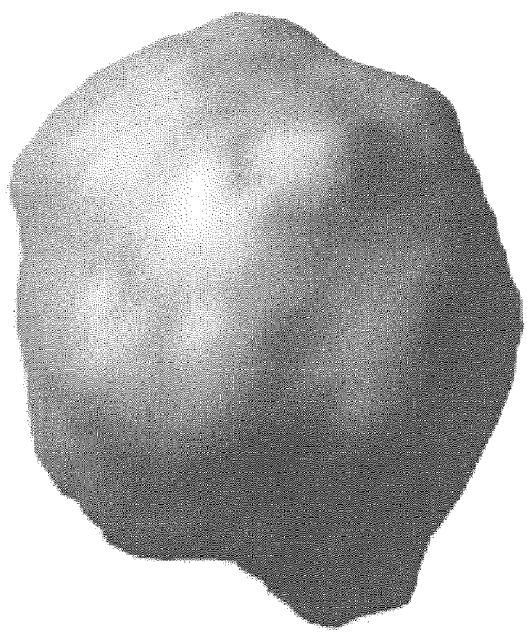
FIGS. 13A-13B represent the 3D rock 1200 after various cycles of a diffusion process have been applied in accordance with one embodiment of the present invention.
Figure 13A:
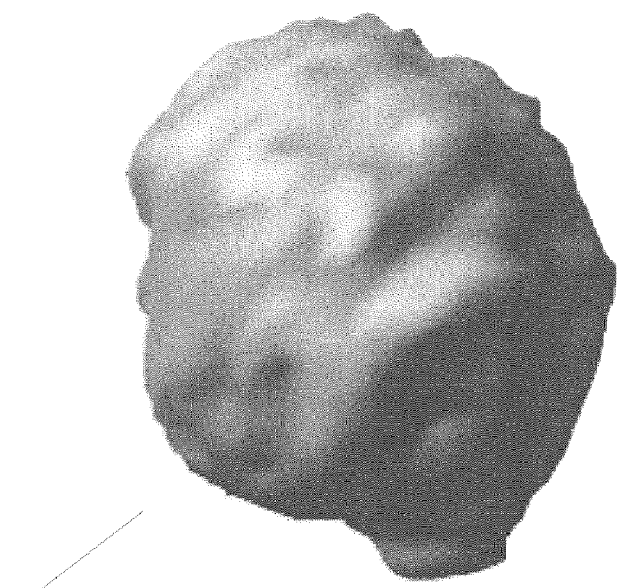

Diffusion may be applied again to smooth the surface. The bumpiness parameter controls the number of follow-up diffusion cycles. With each additional diffusion cycle, the inflated icon becomes smoother as can be seen in FIGS. 13A and 13B. FIG. 13A illustrates two iterations of diffusion and FIG. 13B illustrates three iterations of diffusion. Continued smoothing will eventually turn the inflated icon back into its original shape (before the noise was applied).

Interface

Figure 14:
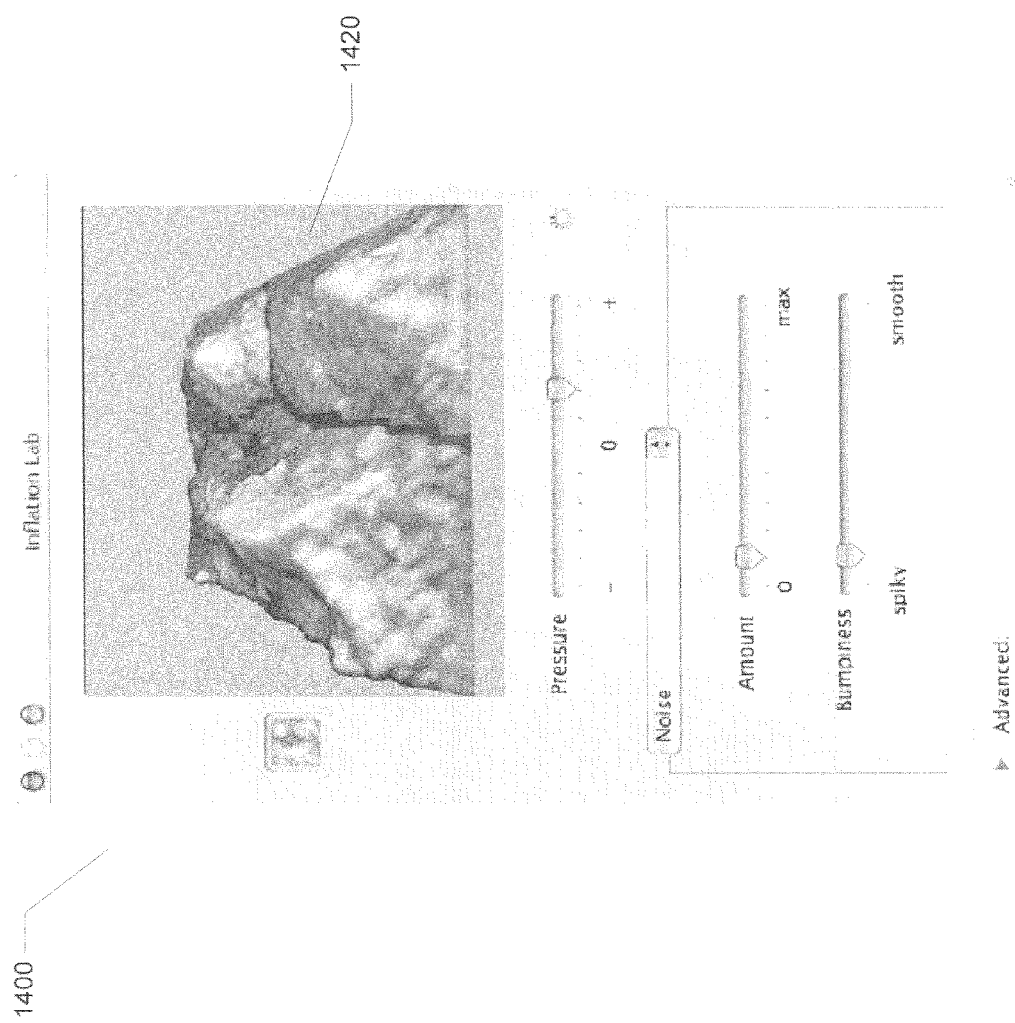
FIG. 14 illustrates a graphical user interface 1400, which facilitates design exploration, in accordance with one embodiment of the present invention.

According to one embodiment, a simple graphical user interface is provided with the main design goal to facilitate exploration. In the example of FIG. 14, the pressure parameter is accompanied with a number of optional parameters, such as the ones described above. Additionally, users can specify orientation (should an inflated icon lay on the ground, such as the lobster icon, or should it be upright, such as the icon of a tree), symmetry (e.g., a circle can be turned into a complete sphere combining positively and negatively inflated copies of a circle icon), and simple composition of different inflatable icons into more complex shapes.

FIG. 14 shows the inflation of a 48×48 pixel icon representing a landscape 1420. Positive pressure inflates the landscape. Color-based pressure shapes the mountains and the river valley: white color represents snow; blue color represents the river. Noise makes the mountains look rough. According to one embodiment, the view showing the Inflated Icon is provided via an OpenGL viewer that includes camera controls (zoom, rotate, pan), which allow users to explore their 3D world from different perspectives.

The interactive nature of the process keeps users in the design loop. A change of pressure will result in inflation/deflation of the icon by running the diffusion process for about 50 steps. In the present example, the inflation process is stable in the sense that it converges. Only for extreme values of pressure will the icon inflation become numerically instable.

According to one embodiment, feedback may be provided to end-users by illustrating intermediate states of the diffusion process. For example, following each individual diffusion step or n diffusion steps, the display may be updated providing users a sense of the process. At the same time, users may continue to edit their icons changing the shape, the texture and, in the case of color-based or pixel location-based pressure modulation, selectively controlling the ongoing diffusion process.

Discussion

Not every icon is suitable to icon inflation. Especially more modem icons that have a three dimensional look may not inflate well for two reasons. First, their shape is pre-distorted to look like a 3D object. The inflatable icon approach assumes that icons are flat two-dimensional projections. A second problem can be shading that, again, is used to create a three dimensional appearance. The inflated icon will inherit the statically shaded texture from its two dimensional icon. Since the inflated icon is a true three-dimensional object placed into a three-dimensional world with potentially many light sources the result may be highly confusing. In some cases, the user can clean up the icon with an icon editor. However, depending on the complexity of the icon this may require a considerable effort.

Some vectorization/polygonization approaches may create models with large mesh sizes. Even a small 32×32 icon may have over 1000 polygons. Assuming that applications, such as simulations, may feature thousands of Inflatable Icons performance could become an issue. We have compared the time required to draw a regular icon with the time to draw an Inflatable Icon.

Test machine: Macintosh G4, 800 Mhz, OS X 10.2.3, Video Board, AT1 Mobile Radeon; test icon: Lobster (FIG. 1):

2D Icon: 280 ps—using native operating system call; and
3D Inflatable Icon: 220 µs—OpenGL 1.3, display lists, one light source, Gouraud shading.

The absolute numbers are irrelevant, however, the fact that even without optimizations such as OpenGL extensions (e.g., compiled vertex arrays) it took less time to create a 3D inflatable icon than a regular 2D one is amazing.

Models produced by icon inflation tend to be smooth making them viable candidates for well-established mesh reduction algorithms if optimization is required.

For large icons it may take pixels far away from the icon edge a long time to rise because the pixels that need to raise the most are surrounded by a very large number of pixels pulling them down. The result is that it takes many more iterations to inflate a large icon. According to one embodiment, the Inflatable Icon process may be used with large icons by first downsampling large images, inflating the downsampled image and then applying the original image as the skin of the resulting 3D model. This way the inflation technique can be applied to images of arbitrary size.

Inflatable Icons are not meant to replace more complex approaches and sophisticated tools for creating 3D models. In applications such as simulation authoring environments end-users, such as kids, need to be able to create good-enough 3D models in seconds or minutes but not in hours. The type of models that can be extruded from a single surface is intrinsically limited. On the other hand, the approach of Inflatable Icons can be extended to introduce more complex extrusion functions and to add sophisticated composition functions. For example, a human model could be assembled from individual body parts, such as noses, ears, fingers, etc., created as individual inflated icons. In this manner, any number of icons could be inflated and then composed into an aggregate model.

Figure 16:
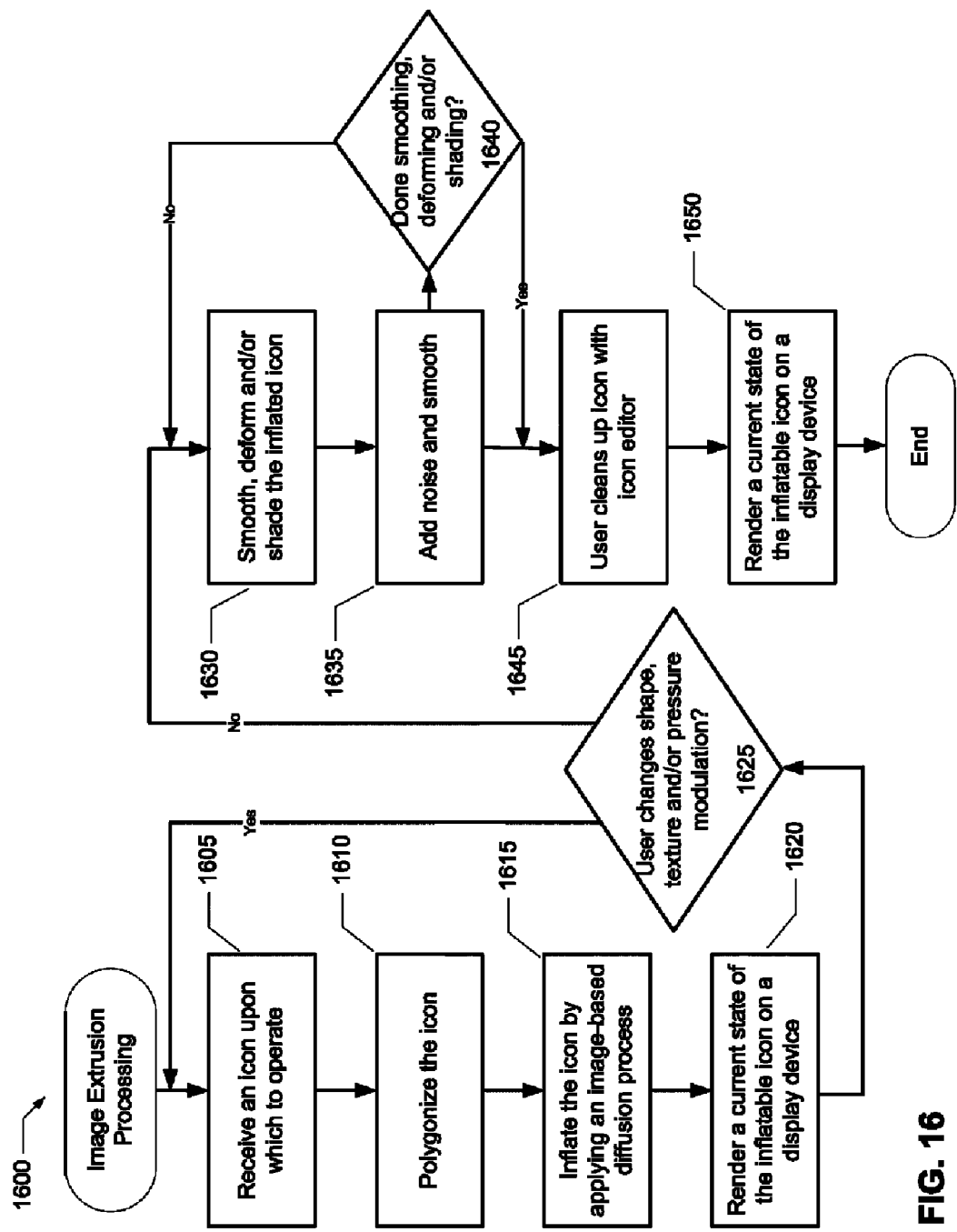
FIG. 16 is a flow diagram illustrating an image extrusion process 1600 according to one embodiment of the present invention.

FIG. 16 is a flow diagram illustrating an image extrusion process according to one embodiment of the present invention. According to the present example, the image extrusion process begins at block 1605. At block 1605, a computer system receives an image (e.g., an icon) upon which an image-based diffusion process will be performed. The image can be either a 2D image or a 3D image with the z-components set to zero or another constant value. In either case, the icon is then polygonized (e.g., using triangles) at block 1610.

The icon is then inflated at block 1615 by applying one or more iterations of an image-based diffusion process. A current state of the inflatable icon may then be rendered on a display device, such as a monitor, to provide the end-user with visual feedback at block 1620.

At block 1625, in an embodiment providing interactive and/or end-user controllable parameters, the user may be provided with the ability to change the shape, texture and/or pressure modulation function associated with the inflatable icon or other user controllable parameter. If the user decides to make a change, processing continues with block 1605 or 1630 as appropriate. Once the inflation process is completed and the user decides to not make anymore changes, the inflatable icon may then be smoothed, deformed, and or shaded at step 1630. The shading can be performed by a one or more methods such as flat shading, Phong shading, and/or Gourand shading.

At this point, at block 1635, the user may be provided with the option of adding noise to the inflated icon. At decision block 1640, the user may then be provided with an opportunity to perform additional smoothing, shading, and/or deformation of the inflatable icon if a determination is made that smoothing, deforming and/or shading is not complete. Once the user is satisfied with the general appearance of the inflatable icon, the user may have the option of performing final touch ups at block 1645. For example, the inflatable icon may be modified with an icon editor.

At block 1650, the current state of the inflatable icon is rendered on a display.

CONCLUSIONS

An interactive, biased diffusion-based 2D image to 3D model extrusion approach called Inflatable Icons has been presented. Inflatable Icons can be produced effectively by quickly sketching 2D icons or using existing 2D icons and turning them, under the control of a user, into a true, polygon-based, 3D model. The diffusion approach is versatile and can easily be extended to create a growing repertoire of extrusion functions.

Inflatable Icons are well suited for applications involving end-user development. End-user developers are typically not professional artists. They may not have the training, motivation, or time to learn how to use professional level 3D modeling tools. Applications of Inflatable Icons include the generation of simple 3D models for simulations or presentations.

In conclusion, the present invention provides novel systems, methods and techniques for generating simple 3D models for simulations, presentations, and the like. While detailed descriptions of one or more embodiments of the invention have been given above, various alternatives, modifications, and equivalents will be apparent to those skilled in the art without varying from the broader spirit and scope of the invention. The specification and drawings are, accordingly, to be regarded in an illustrative rather than a restrictive sense. Therefore, the above description and drawings should not be taken as limiting the scope of the invention, which is defined by the appended claims.

What is claimed is:

1. A method comprising:

a vectorizing module polygonizing an input image to produce an inflatable image by representing a set of pixels making up the input image as a plurality of polygons;

an extrusion module extruding the inflatable image by generating appropriate z-coordinate values for a reference point associated with each polygon of the plurality of polygons of the inflatable image based upon a biased diffusion process;

an interface module allowing end-user controlled pressure modulation by (i) adjusting one or more modulation functions employed by the biased diffusion process based upon end-user input regarding relative modulation bias for a selected set of one or more pixels associated with the inflatable image or (ii) applying the biased diffusion process to only the selected set of one or more pixels; and wherein the vectorizing module, the extrusion module and the interface module are implemented in one or more computer processors and one or more computer-readable storage media of one or more computer systems, the one or more computer-readable storage media having instructions tangibly embodied therein that are executable by the one or more computer processors.

2. The method of claim 1, wherein said representing the set of pixels as a plurality of polygons comprises representing each pixel in the set of pixels as a plurality of triangles.

3. The method of claim 1, further comprising the interface module providing visual feedback to an end-user by rendering a current state of the inflatable image on a display device during an intermediate point of said biased diffusion process.

4. The method of claim 1, further comprising the interface module allowing end-user controlled color-based pressure modulation by adjusting color modulation functions employed by the biased diffusion process based upon end-user input regarding relative modulation bias for one or more colors associated with the input image.

5. The method of claim 1, further comprising the interface module allowing end-user controlled noise to be applied to the inflatable image, wherein a noise parameter controlled by the end-user includes one or more of a noise amplitude and a number of diffusion iterations.

6. The method of claim 1, wherein the input image comprises a two dimensional icon.

7. The method of claim 1, wherein the input image comprises a three dimensional image.

8. The method of claim 1, further comprising:
prior to said polygonizing an input image, generating the input image by receiving a large image, generating a down sampled image by down sampling the large image, and using the down sampled image as the input image; and
after said extruding the inflatable image, applying the large image as skin on the extruded inflatable image.

9. A program storage device readable by a computer system, tangibly embodying a program of instructions executable by one or more computer processors of the computer system to perform method steps for creating an inflatable icon, said method steps comprising:
polygonizing an input image to produce the inflatable icon by representing a set of pixels making up the input image as a plurality of polygons;
extruding the inflatable icon by generating appropriate z-coordinate values for a reference point associated with each polygon of the plurality of polygons of the inflatable icon based upon a biased diffusion process;
allowing end-user controlled pressure modulation by (i) adjusting one or more modulation functions employed by the biased diffusion process based upon end-user input regarding relative modulation bias for a selected set of one or more pixels associated with the inflatable icon or (ii) applying the biased diffusion process to only the selected set of one or more pixels.

10. The program storage device of claim 9, wherein said representing the set of pixels as a plurality of polygons comprises representing each pixel in the set of pixels as a plurality of triangles.

11. The program storage device of claim 9, wherein said method steps further comprise providing visual feedback to an end-user by rendering a current state of the inflatable icon on a display device during an intermediate point of said biased diffusion process.

12. The program storage device of claim 9, wherein said method steps further comprise allowing end-user controlled color-based pressure modulation by adjusting color modulation functions employed by the biased diffusion process based upon end-user input regarding relative modulation bias for one or more colors associated with the input image.

13. The program storage device of claim 9, wherein said method steps further comprise allowing end-user controlled noise to be applied to the inflatable icon, wherein a noise parameter controlled by the end-user includes one or more of a noise amplitude and a number of diffusion iterations.

14. The program storage device of claim 9, wherein the input image comprises a two dimensional icon.

15. The program storage device of claim 9, wherein the input image comprises a three dimensional image.

16. The program storage device of claim 9, wherein said method steps further comprise:
prior to said polygonizing an input image, generating the input image by receiving a large image, generating a down sampled image by down sampling the large image, and using the down sampled image as the input image; and
after said extruding the inflatable icon, applying the large image as skin on the extruded inflatable icon.

17. A method comprising:
a vectorizing module polygonizing an input image to produce an inflatable image by representing a set of pixels making up the input image as a plurality of polygons;
an extrusion module extruding the inflatable image without use of three dimensional information about the input image by applying a biased diffusion process to generate appropriate z-coordinate values for a reference point associated with each polygon of the plurality of polygons; and
wherein the vectorizing module and the extrusion module are implemented in one or more computer processors and one or more computer-readable storage media of one or more computer systems, the one or more computer-readable storage media having instructions tangibly embodied therein that are executable by the one or more computer processors.

18. The method of claim 17, further comprising an interface module allowing end-user controlled pressure modulation by adjusting one or more modulation functions employed by the biased diffusion process based upon end-user input regarding relative modulation bias for a selected set of one or more pixels associated with the inflatable image, wherein the interface module is implemented in the one or more computer processors and the one or more computer-readable storage media.

19. The method of claim 17, further comprising an interface module allowing end-user controlled pressure modulation by applying the biased diffusion process to only a selected set of one or more pixels associated with the inflatable image, wherein the interface module is implemented in the one or more computer processors and the one or more computer-readable storage media.

20. The method of claim 17, further comprising an interface module providing visual feedback to an end-user by rendering a current state of the inflatable image on a display device during an intermediate point of said biased diffusion process, wherein the interface module is implemented in the one or more computer processors and the one or more computer-readable storage media.

* * * * *